United States Patent [19]
Allam et al.

[11] Patent Number: 5,291,034
[45] Date of Patent: Mar. 1, 1994

[54] NON-LINEAR QUANTUM DOT OPTICAL DEVICE

[75] Inventors: Jeremy Allam; Mathias Wagner, both of Cambridge, United Kingdom

[73] Assignee: Hitachi, Ltd., Tokyo, Japan

[21] Appl. No.: 983,906

[22] Filed: Dec. 1, 1992

[30] Foreign Application Priority Data

Dec. 3, 1991 [GB] United Kingdom ............ 9125727

[51] Int. Cl.$^5$ ............................................. H01L 27/14
[52] U.S. Cl. ....................................... 257/17; 257/20; 257/21; 257/24; 257/184; 359/248
[58] Field of Search ................. 257/21, 14, 17, 20, 257/24, 22, 194, 195, 184; 359/248, 243

[56] References Cited

U.S. PATENT DOCUMENTS

| | | | |
|---|---|---|---|
| 4,751,194 | 6/1988 | Cibert et al. | 257/14 X |
| 4,880,297 | 11/1989 | Fejer et al. | 350/355 |
| 5,012,304 | 4/1991 | Kash et al. | 257/18 |
| 5,170,226 | 12/1992 | Fukuzawa et al. | 257/14 |

FOREIGN PATENT DOCUMENTS

| | | |
|---|---|---|
| 0324505 | 7/1989 | European Pat. Off. |
| 0361508 | 4/1990 | European Pat. Off. |
| 2215122 | 9/1989 | United Kingdom |

OTHER PUBLICATIONS

Temkin et al., "Low-Temperature Photoluminescence From InGaAs/InP Quantum Wires and Boxes," *Appl. Phys. Lett.* 50(7), Feb. 16, 1987, pp. 413–415.

Khurgin, "Novel Configuration of Self-Electro-Optic Effect Device Based on Asymmetric Quantum Wells", *Appl. Phys. Lett.* 53(9), Aug. 29, 1988, pp. 779–781.

*Primary Examiner*—William Mintel
*Attorney, Agent, or Firm*—Kenyon & Kenyon

[57] ABSTRACT

A non-linear optical device utilizes laterally asymmetrical quantum dot structures (D1–D5) that are tunable in terms of their lateral asymmetry by bias potentials (V1, V2) applied to laterally extending electrode structures (13, 14).

21 Claims, 7 Drawing Sheets

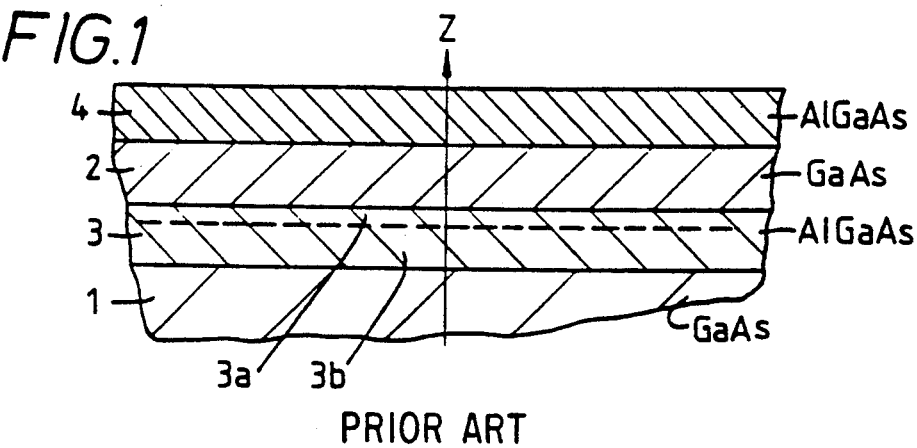
FIG. 1 PRIOR ART
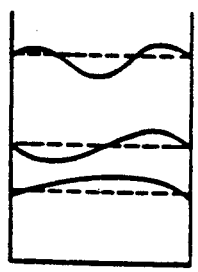
FIG. 2A
Symmetric quantum well
PRIOR ART
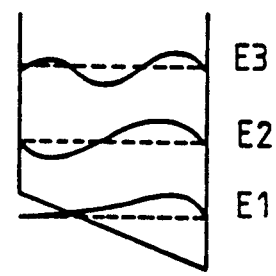
FIG. 2B
Biased quantum well
PRIOR ART
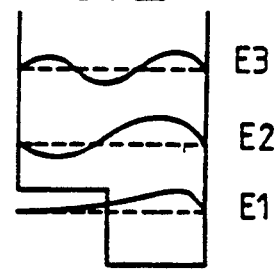
FIG. 2C
Asymmetric quantum well
PRIOR ART
FIG. 3A
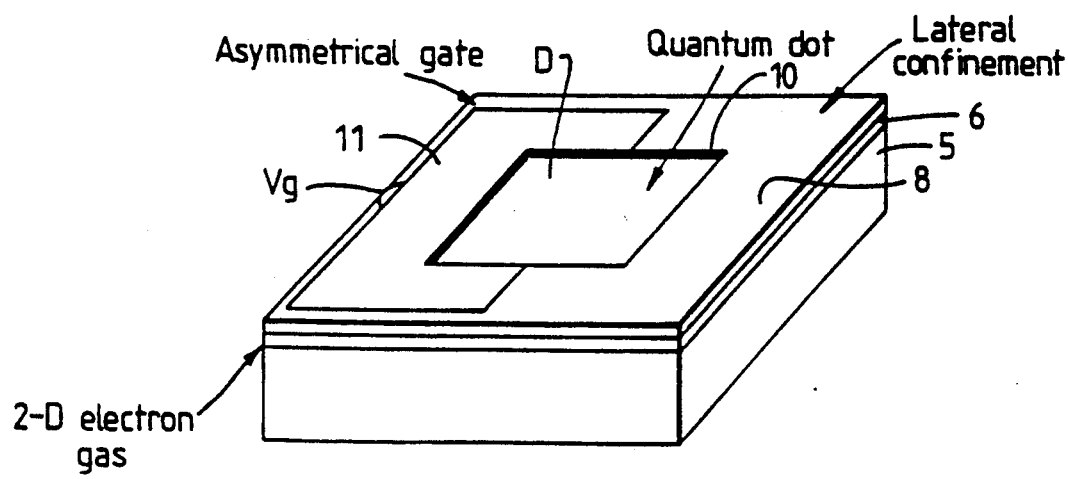

Symmetric quantum dot

Asymmetric quantum dot y Fraction = 0.0 y Fraction = 0.2 y Fraction = 0.3 y Fraction = 0.5

NON-LINEAR QUANTUM DOT OPTICAL DEVICE

FIELD OF THE INVENTION

This invention relates to a non-linear optical device utilising a quantum dot structure.

BACKGROUND OF THE INVENTION

The effect of incident radiation on a crystal can be characterised as follows:

$$P = X^{(1)}\epsilon + X^{(2)}\epsilon^2 \qquad (1)$$

where
- P = induced dipole moment
- $\epsilon$ = applied electric field
- $X^{(1)}$ = first order coefficient
- $X^{(2)}$ = second order coefficient The first order term in Equation 1 defines energy absorption by the crystal whereas the second order term has proved of particular interest since by providing a crystal which optimizes the second order effect, it is possible to achieve sum and difference frequency generation including second harmonic generation and optical rectification. Applications include frequency doublers in which input laser radiation is frequency doubled by the crystal to provide a source of intense coherent radiation outside of the frequency range where high performance semiconductor lasers can operate. Other uses include parametric amplification and optical detection.

The majority of inorganic crystals have small non-linear optical coefficients. The second-order coefficient can be greatly increased in epitaxially grown non-centrosymmetric (lacking inversion symmetry) multi layer structures, but the coefficients are sensitively dependent on the growth parameters and are not easily controllable after growth.

Recently, investigations have been carried out into the optical response of epitaxially grown semiconductor 2-dimensional quantum wells. It has been found that the heterojunction discontinuities lead to sub-bands with energy spacings in the range of $10^{-3} - 1$ eV (corresponding to wavelengths of about 1 mm-1 $\mu$m) depending on the material parameters and quantum well dimensions. When the quantum wells are essentially symmetrical, a large, first order absorption of input radiation has been reported hitherto (L. C. West and S. J. Eglash, "First observation of an extremely large dipole infrared transition within the conduction band of a GaAs quantum well", Appl. Phys. Lett. 46, p. 1157, 1985). In such symmetrical quantum wells, the second order effects are forbidden. However, it has been reported that second-order effects can be obtained if the inversion symmetry is removed by the application of an electrical field or by the growth of compositionally asymmetric wells. [L. Tsang, D. Ahn and S. l. Chuang, "Electric field control of optical second-harmonic generation in a quantum well", Appl. Phys. Lett. 52, P. 697 (1988); M. M. Fejer, S. J. B. Yoo, R. L. Byer, Alex Harwitt and J. S. Harris, Jr., "Observation of extremely large quadratic susceptibility at 9.6-10.8 $\mu$m in electric-field-biased AlGaAs quantum wells", Phys. Rev. Lett. 62(9), p. 1041 (1989); M. K. Gurnick and T. A. DeTemple, "Synthetic non-linear semiconductors", IEEE J. Quantum Electronics QE-19, p. 791, 1983; and E. Rosencher, P. Bois, J. Nagle and S. Delaitre, "Second harmonic generation by intersub-band transitions in compositionally asymmetrical MQW's", Electronics Lett. 25, P. 1063 (1989); C. Sirtori, F. Capasso, D. L. Sivco, S. N. G. Chu and A. Y. Cho, "Observation of large second-order susceptibility via intersubband transition at $\lambda \approx 10$ $\mu$m is asymmetric coupled AlInAs/GaInAs quantum wells", Appl. Phys. Lett. 59, 2302 (1991)]. By engineering well widths and barrier heights, the energy levels can be tuned to create two and three level systems whose energy separation is matched to the incoming radiation, and the structure can be optimized for optical rectification or second harmonic generation, for example.

Such prior art arrangements will now be described in more detail with reference to FIGS. 1 and 2.

FIG. 1 shows a section through an essentially two dimensional quantum well formed in an AlGaAs/GaAs/AlGaAs double heterostructure wafer. A device is shown schematically and comprises a GaAs substrate 1 with a GaAs layer 2 arranged between overlying and underlying AlGaAs layers 3, 4. As is well known in the art, an essentially two dimensional electron gas is formed in the GaAs layer 2 as a result of the heterojunctions 2, 3 and 2, 4.

The potential across the potential well in the vertical direction z is shown in detail in FIG. 2a. It will be seen that the well is symmetrical since the structure is centrosymmetric. As a result, incident optical radiation tends to be absorbed between particular quantized energy states E1, E2, E3 permissible within the well as shown in FIG. 2a, but there are no second order effects.

As shown in FIG. 2B, an asymmetry can be produced by applying an electric field in the vertical direction z so that there is a potential gradient within the well. Similarly, as shown in FIG. 2C, an asymmetric quantum well can be produced by introducing an additional layer between layer 2 and one of the layers 3, 4. Thus, as shown in FIG. 1, if the alloy composition (fraction of Al in $Al_xGa_{1-x}As$) in the region 3a is made less than that in region 3b, a stepped characteristic for the potential in the well is produced as shown in FIG. 2C.

Both of the asymmetric wells (FIGS. 2B and 2C) exhibit second order effects in response to incident radiation and thus can be used as components for frequency doublers or the like. However, these known asymmetrical wells suffer a disadvantage in that they are not readily tunable. For the well shown in FIG. 2B the tunability is limited by ionization which occurs at high fields. The configuration shown in FIG. 2C is not tunable and the asymmetry is set by the alloy composition and layer thickness achieved during epitaxial growth.

SUMMARY OF THE INVENTION

In accordance with the present invention, the two-dimensional electron gas in the quantum well is confined laterally to produce a quantum dot structure, and is provided with a lateral asymmetry controllable by an applied bias.

In accordance with the present invention there is provided a non-linear optical device comprising at least one quantum dot structure including means for defining a potential well configuration for a charge carrier in a quantised energy state, the well configuration including at least one well having a given depth and lateral extent, and means for applying an electrical bias to the well configuration to alter the lateral extent thereof and thereby control an asymmetry therein that manifests a non-linear optical characteristic in response to incident radiation.

As used herein the term "optical radiation" includes both visible and non-visible radiation e.g. infrared.

BRIEF DESCRIPTION OF THE DRAWINGS

In order that the invention may be more fully understood embodiments thereof will now be described by way of example with reference to the accompanying drawings wherein:

FIG. 1 is a sectional view of a prior art quantum well structure;

FIGS. 2A to 2C illustrate various potential wells associated with the quantum well of FIG. 1;

FIG. 3A is a schematic perspective view of a non-linear device according to the present invention;

FIGS. 4A and 4B are plan views of the quantum dot shown in FIG. 3 wherein FIG. 4A shows a symmetrical quantum dot, and FIG. 4B shows the asymmetry introduced by an applied electric field;

DETAILED DESCRIPTION

Figure 3B:
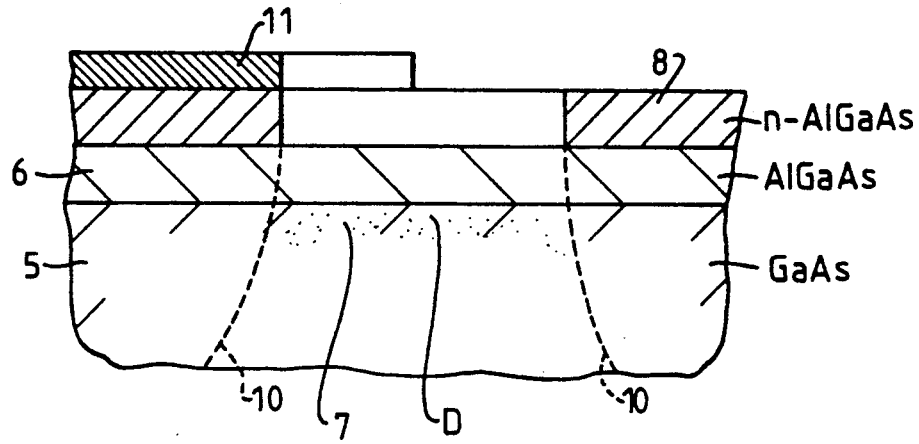
FIG. 3B is an embodiment of a sectional view taken across the quantum dot shown in FIG. 3A.

The non-linear devices described hereinafter are formed from an array of quantum dot structures, each of which can be given a desired lateral asymmetry by the application of a lateral bias field, and a single quantum dot for this purpose will now be described with reference to FIGS. 3A and 3B.

The quantum dot is conveniently fabricated on a modulation-doped semiconductor heterostructure such as a AlGaAs/GaAs/AlGaAs double heterostructure, or a GaAs/AlGaAs HEMT wafer. The device fabricated on a HEMT wafer is shown in section in FIG. 3B and consists of a GaAs layer 5 overlaid by a AlGaAs layer 6. As is well known, a 2-dimensional electron gas 7 can exist at the heterojunction between the layers 6 where the electrons originate from an n-doped AlGaAs layer 8. The electrons can be constrained to define a quantum dot D by lateral patterning. In the arrangement shown in FIG. 3B, ion bombardment creates an insulating region 10 around the periphery of the dot thereby providing lateral confinement for the dot D. It will be appreciated that this lateral confinement can alternatively be provided by etching, or by electrically-activated implants. Alternatively, surface Schottky gates can be used to achieve dot confinement. The dimensions of the quantum dot are chosen to give intersubband spacings that match the desired wavelength of operation, so as to achieve energy absorption from incoming optical radiation. By use of nanofabrication techniques such as electron beam lithography or focused ion beam implantation, the lateral dimensions can be made sufficiently small that the intersubband separations correspond to light wavelengths in the infrared.

In accordance with the present invention, an additional gate 11, which may be a Schottky contact or an activated implant, is provided around a portion of the periphery of the quantum dot to permit a lateral bias field to be applied to the dot. Thus, by applying a voltage Vg to the electrode 11, an asymmetry can be introduced into the lateral extent of the quantum dot. However, there is no potential gradient within the quantum dot.

Figure 4A:
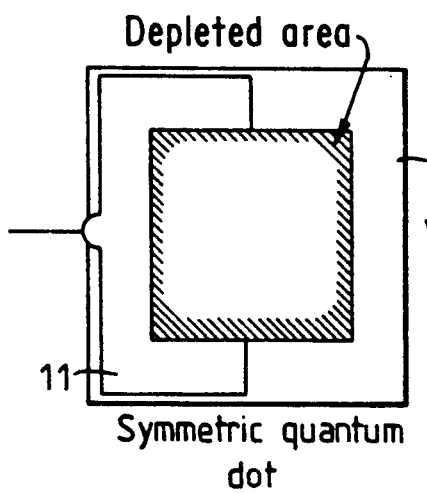

Thus, referring to FIG. 4a, the quantum dot is shown in plan view with a voltage Vg=0 applied to the electrode 11. As a result, a small depleted area 12 extends symmetrically around the periphery of the dot confinement region 10 and so the quantum dot D has a symmetrical lateral configuration.

Figure 4B:
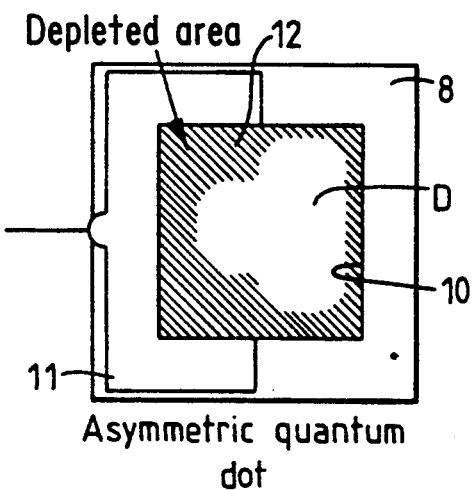

However, as shown in FIG. 4B, when a potential Vg ≠0 is applied to the gate electrode 11, the dot D is imparted with a lateral asymmetry since the bias field established by potential Vg produces an asymmetrical enlarged depletion region 12.

Figure 5A:
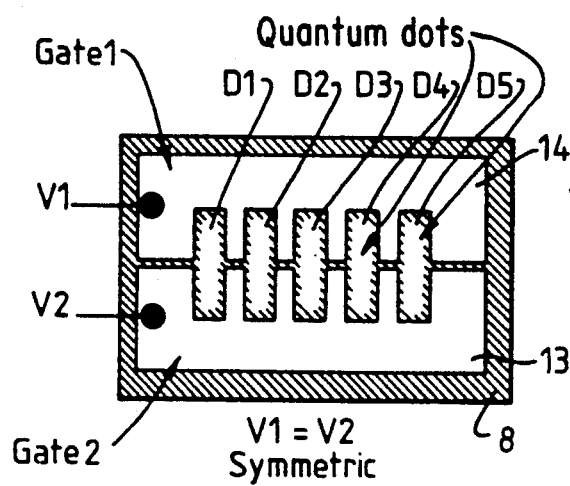
FIGS. 5A and 5B are plan views of an array of quantum dots which, in FIG. 5A are symmetrically disposed whereas in FIG. 5B, the dots are given an asymmetry by an applied lateral bias field.
Figure 5B:
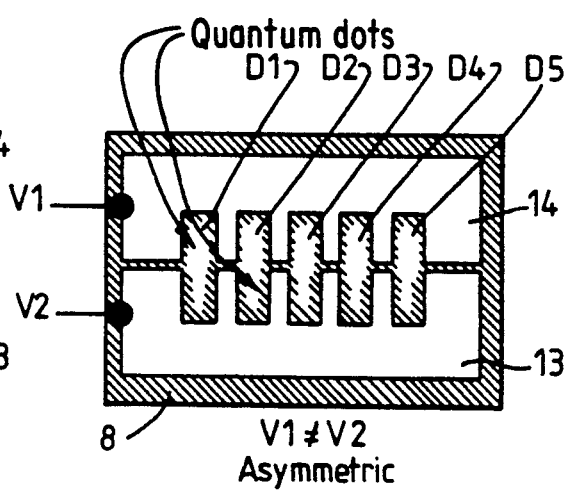

In practice, a device according to the present invention may utilize an array of such quantum dots and a schematic configuration for such an array is shown in FIGS. 5A and 5B. Five quantum dots D1–5 are shown, which are defined by a confinement region 10 in the manner described with reference to FIGS. 3A, 3B, 4A and 4B. Two gate electrodes 13, 14 are provided around opposite halves of the wells. Thus, as shown in FIG.

5A, when V1=V2 symmetrical quantum dots are produced whereas, as shown in FIG. 5B, when V1≠V2 the dots are imparted with a lateral asymmetry.

Figure 6:
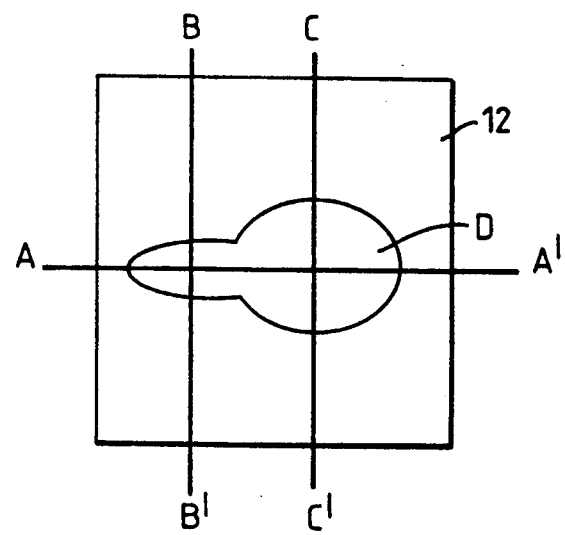
FIG. 6 is a schematic view of an asymmetric quantum dot corresponding to FIG. 4B.
Figure 7A:
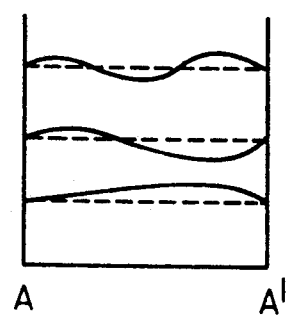
FIGS. 7A to 7C illustrate a potential well taken along section lines A—A', B—B' and C—C' shown in FIG. 6, thereby illustrating the asymmetric wavefunctions developed at three quantized energy levels E1, E2, E3.
Figure 7B:
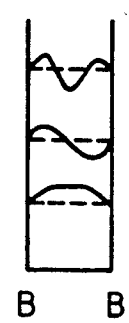
Figure 7C:
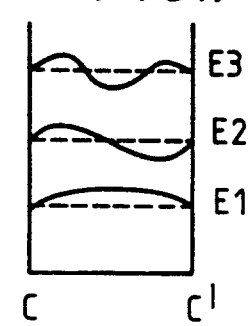

Referring now to FIGS. 6 and 7A to 7C, FIG. 6 shows a plan view of an asymmetrical quantum dot and FIGS. 7A to 7C show three sections through the potential well of the dot, taken along the lines A—A', B—B' and C—C' of FIG. 6. It can be seen that for the quantized energy levels E1, E2, E3, the wavefunction is dimensionally asymmetric along the direction A—A' so that when incident light is directed onto the quantum dot, induced dipole moment P includes both first and second order terms according to Equation 1. Thus, the well can readily be used for harmonic generation, e.g., for frequency doubling in a manner known per se in the art. The non-zero second-order optical coefficients arise due to a shift in the mean electronic position between different modes of the quantum dot, due to the induced asymmetry. The degree of asymmetry of the well is a function of the applied voltage V1-V2 and thus the well can be tuned to maximize desired second order effects. Furthermore, by selecting the absolute values of V1 and V2 the dimensions of the well can be controlled to achieve tuning to the wavelengths of incoming radiation and the depth of the well can be controlled. Accordingly, the tuning of the well both in terms of its asymmetry and overall dimensions can be achieved and is not limited by the geometries achieved during fabrication, since the dimensions can be adjusted by applied electrical potentials.

Figure 8A:
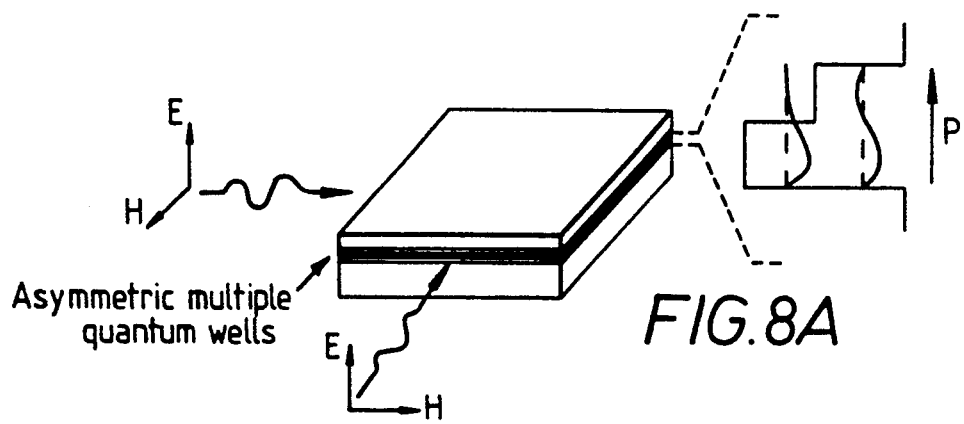
FIG. 8A illustrates how incident light needs to be directed laterally into a side edge of a prior art device corresponding to FIG. 1.
Figure 8B:
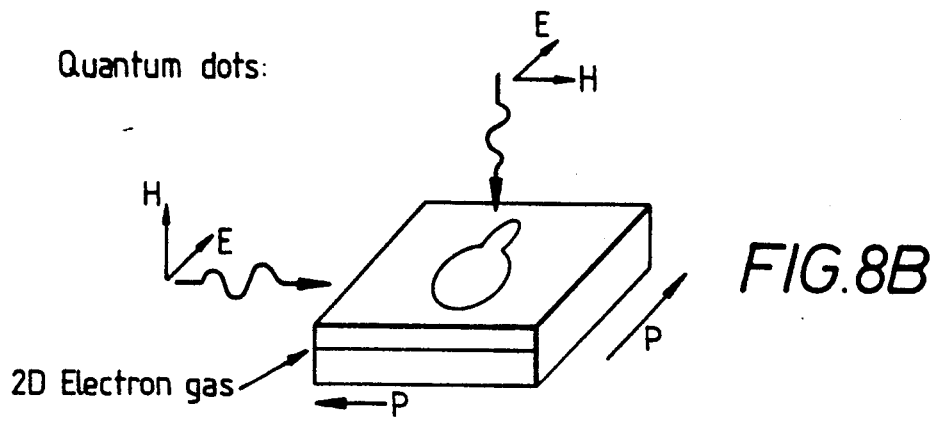
FIG. 8B illustrates that incident light can be directed normally on a major face of the wafer in a device according to the present invention.

Referring now to FIGS. 8A and 8B, an array of quantum wells of known type, corresponding to that shown in FIG. 1 is shown schematically in FIG. 8A. A problem with this prior arrangement is that the quantum wells are disposed normally to the major face of the wafer so that the dipole moment for the asymmetrical wells extends vertically as shown in FIG. 8A. In order to achieve resonance, the incident optical radiation needs to be directed normally to the direction of the induced dipole moment P, which means that light needs to be directed on to side edges of the wafer, requiring careful focusing or coupling via surface gratings.

However, as shown in FIG. 8B, the dipole moment of the quantum dots described with reference to FIGS. 3 to 7, is in the plane of the wafer which means that light can be directed both transversely to the major face of the wafer (or through certain side edges thereof).

Figure 9:
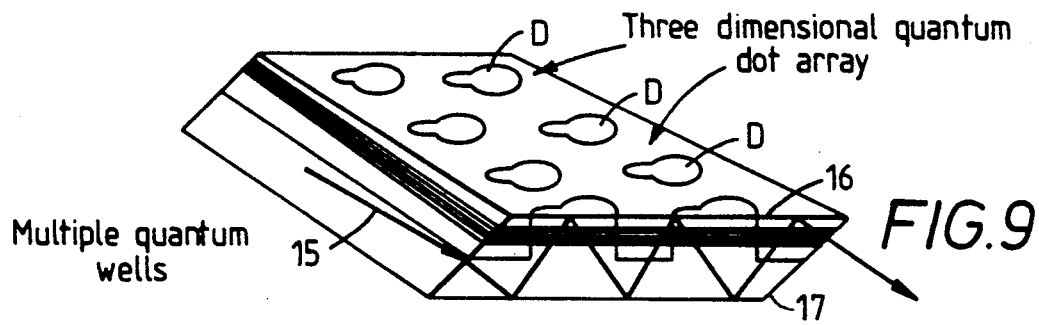
FIG. 9 is a schematic perspective view of a more practical form of device in accordance with the present invention, wherein light is caused by internal reflection to pass through a plurality of quantum dots in an array thereof.

In order to increase the interaction volume of the quantum dots with the incident radiation, 2-or 3-dimensional arrays of dots can be fabricated. This increases conversion efficiency. The 3-dimensional arrays can be fabricated as multiple, overlying modulation-doped quantum wells, which are confined by the same lateral potential, produced by deep implantation. Furthermore, a multipass waveguide configuration may be utilised as shown in FIG. 9. Thus, incident light 15 passes by multiple reflection between upper and lower surfaces 16,17 of a wafer which includes a plurality of layers of quantum dots arranged in a 3-dimensional array.

Figure 10:
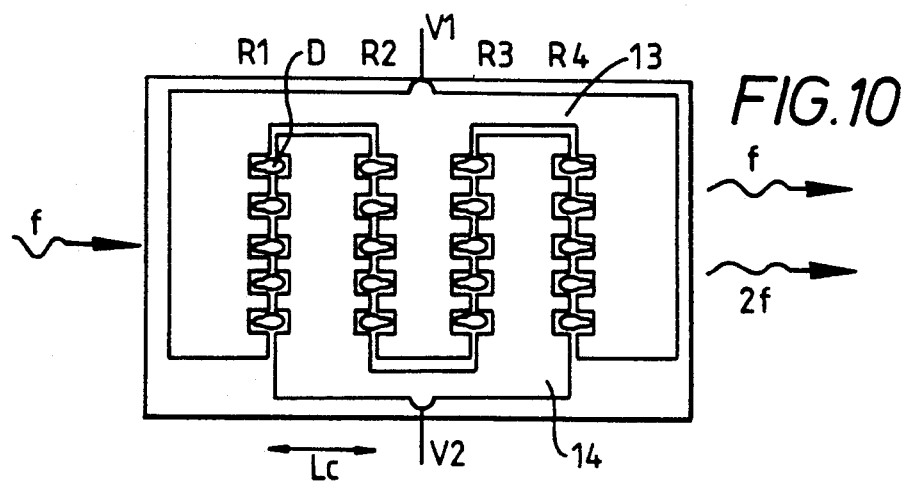
FIG. 10 is a plan view of a device according to an embodiment of the present invention, for use as a frequency doubler in which alternate rows of quantum dots are arranged with their asymmetry reversed in order to achieve a phase matching condition for frequency doubling.

It will be appreciated that the direction of the dipole moment of the dots can be reversed simply by reversing V1 and V2. Thus, the device is particularly suited for quasi-phase matching. A plan view of the gate configuration in one particular structure for phase matching in a non-linear waveguide is shown in FIG. 10. A 3-dimensional array of dots D is provided, arranged in rows R1, R2, R3, R4. Rows R1 and R3 receive the potential difference V1-V2 in a first sense whereas rows R2, R4 receive the potential difference in the opposite sense thus producing a reversal of the dipole moment vector for alternate rows. By appropriately selecting the applied potentials and the spacing between the rows, the device can be used as a frequency doubler and thus input radiation of a frequency F, e.g., from a laser, can be used to produce an output of a frequency F and 2F, e.g., by the use of a waveguide structure as shown in FIG. 9.

Figure 11:
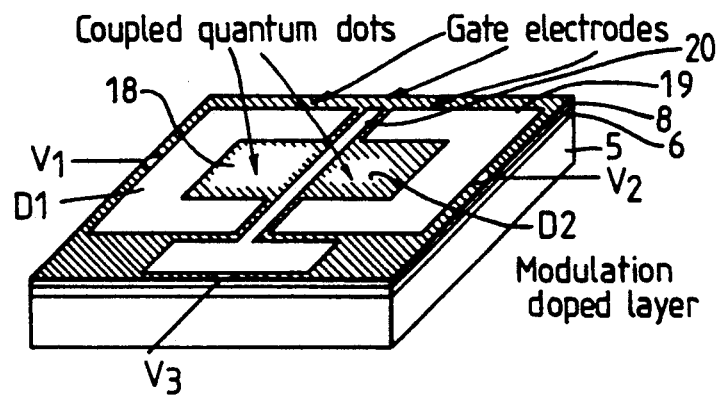
FIG. 11 is a schematic perspective view of a device according to the present invention wherein the quantum dot structure includes a potential well configuration with first and second asymmetrically disposed wells with a controllable barrier between them.

The examples of the present invention described so far make use of a laterally asymmetric single quantum dot. However, in accordance with the present invention, it is possible to achieve the desired asymmetry by the use of a quantum dot structure which includes first and second quantum dots providing a potential well configuration including first and second wells having different lateral extents that are closely coupled so as to manifest a non-linear optical characteristic. An example of such a device is shown in FIG. 11.

The basic wafer structure is similar to that shown in FIG. 3B and consists of a GaAs substrate 5 provided with overlying AlGaAs layer 6 and n-AlGaAs layer 8. The ion damaged insulation region 10 is however configured to permit two quantum dots D1, D2 to be formed. Dot D1 is surrounded on three sides by a control electrode 18, similar in function to electrode 11 of FIG. 4. Quantum dot D2 is surrounded on three sides by corresponding electrode 19. In addition, electrode 20 is disposed between the dots D1, D2, and controls the width of the potential barrier between them.

Figure 12A:
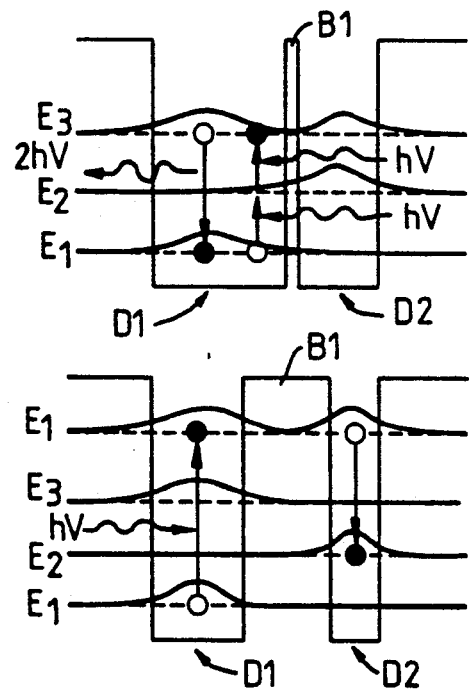
FIGS. 12A and 12B illustrate schematically permitted electron states associated with the wells.
Figure 12B:
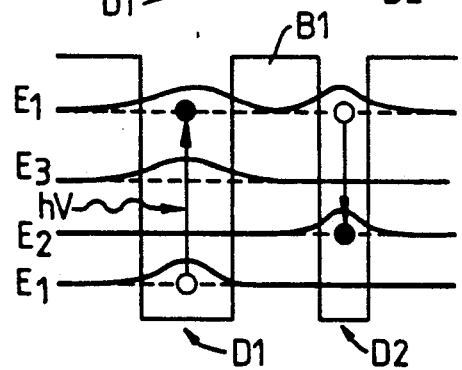

Referring now to FIGS. 12A and 12B, they show the potential wells established in the two dots D1, D2 and three permitted quantized energy levels E1, E2, E3. Since the quantum dots D1 and D2 are closely spaced, the quantum mechanical wavefunction extends between the two dots. For the lowest permitted electron state E1, the electron probability density is at a maximum in well D1. For the energy level E2, the maximum is in well D2. For the highest level E3, maxima occur in both well D1 and D2. This configuration results from the fact that the dot D2 is smaller than dot D1, which is achieved by appropriate selection of the potential V1 and V2 applied to electrodes 18, 19 (FIG. 11). A resulting lateral asymmetry of the dots D1, D2 gives rise to non-linear optical characteristics. The particular form of non-linear effect is determined by the width of barrier B1 between the dots D1, D2 and the barrier width is controlled by voltage V3 applied to electrode 20.

Referring to FIG. 12A, the barrier B1 is selected to be relatively narrow, which gives rise to a structure optimized for second harmonic generation.

In response to incoming radiation of wavelength hv electrons in the quantum dots D1, D2 are pumped from energy state E1 to state E2 and from state E2 to state E3, and electrons in state E3 can decay directly to state E1 thereby producing output radiation of wavelength 2 hv, i.e., frequency doubling. In order to achieve such doubling, the quantum dots D1, D2 need to be tuned in terms of their lateral extent to achieve the desired quantum mechanical resonances such that the energy states E1, E2, E3, are disposed as shown in FIG. 12A. This can readily be achieved according to the present invention by appropriate adjustment of the bias voltages V1, V2, V3.

FIG. 12B shows a configuration in which the barrier B1 between the quantum dots D1, D2 is relatively thick. This gives rise to a structure optimized for a different non-linear effect: optical rectification. The quantum dots D1, D2 are sufficiently close that the quantum mechanical wave functions associated therewith exhibit quantized energy levels E1-E4 wherein levels E1 and E2 exhibit spatial resonances in the dots D1, D2 respectively and level E4 exhibits spatial maxima in both of the wells. In this way, incoming radiation of wavelength hv can be used to pump electrons from base state E1 to state E4 and then to decay from state E4 to state E2. The decay of the electron in state E2 is slow, so that optical pumping at energy hv gives rise to a long-lived electrical dipole and consequently a large optical rectification coefficient. Again, since the coupling asymmetry between the wells can be readily tuned by the applied potentials V1, V2, V3 the configuration of quantum mechanical energy states and resonances shown in FIG. 12B can readily be achieved. This contrasts with prior two-well configurations formed in a vertical doped structure as described by Capasso et al (supra), where the resonances are defined by the epitaxial growth processes.

Figure 13:
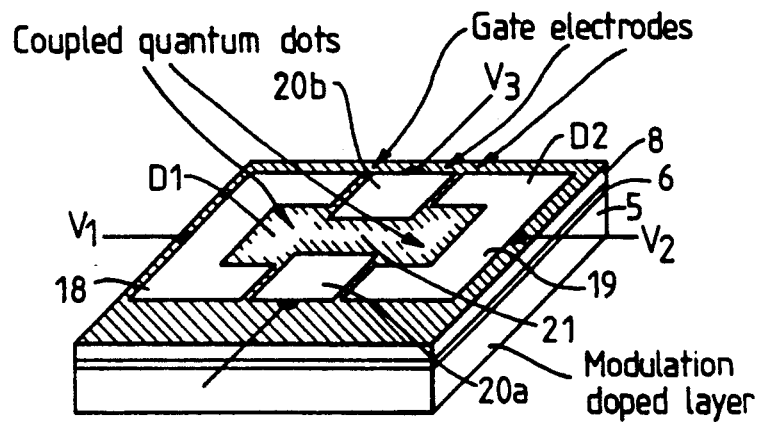
FIG. 13 is a schematic perspective view of an alternative form of the device with a conductive elongate region extending between the first and second wells.
Figure 14:
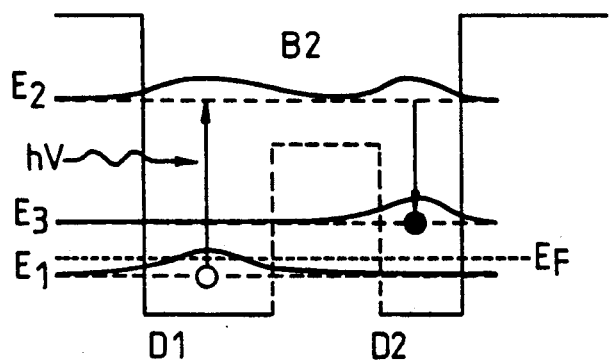
FIG. 14 is a diagram of permitted energy states associated with the wells shown in FIG. 13.

A modification of the device of FIG. 11 is shown in FIG. 13. In this arrangement, the quantum dots, D1 D2 are coupled by a conductive region 21 to define a "dogbone" configuration. In order to control the width of the conductive region 21, the electrode 20 is formed in two parts 20a, 20b and the potential V3 applied thereto produces a spatial pinching of the width of region 21. The spatial asymmetry of the dots D1, D2 gives rise to non-linear effects as will now be described with reference to FIG. 14.

The potential wells associated with dots D1, D2 are separated by a conductive channel 21 which is narrow compared to the quantum dot dimensions, so that excited states of the quantum dots D1 and D2 are coupled by the channel, whereas low energy states are essentially independent. The effect is equivalent to a barrier B2, shown by the dashed profile in FIG. 14, the height of which is somewhat lower than that shown in FIG. 12. The permitted energy states E1, E2, E3 are configured such that energy state E1 is below the Fermi level $E_F$ and has its resonance in well D1. Energy state E3 exists above the Fermi level with a resonance in well D2. Level E2 is disposed above the height of the effective barrier B2 and has resonances associated with each of the wells D1, D2. Since only level E1 is disposed below the Fermi level $E_F$, only level E1 will be populated in the absence of incoming light. By appropriate selection of the potentials applied to electrodes 18, 19, 20, the quantum dots D1, D2 can be tuned to incoming radiation such that if the wavelength hv of incoming radiation corresponds to the difference in energy levels E2-E1, the electrons from the base level E1 are pumped into level E2 and thereafter can decay from level E2 to level E3.

Figure 15A:
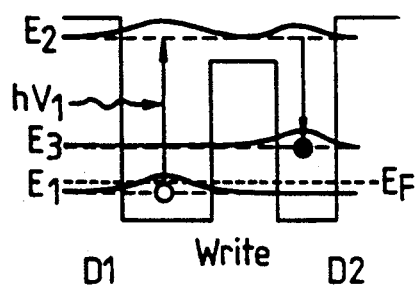
FIGS. 15A and 15B illustrate how the device of either FIG. 13 or FIG. 11 can be used as an optical memory.
Figure 15B:
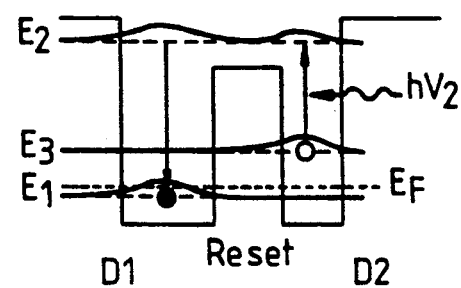

This process can be used to provide optical memory elements. If the lifetime of state E3 is made sufficiently long, the device can operate as an essentially bistable memory element. The memory is "written" by illumination $hv_1 = E2-E1$, which as shown in FIG. 15A populates level E3. The memory is "reset" by illumination at $hv_2 = E2-E3$, as shown in FIG. 15B. The element can be read by detecting the photovoltage at two external contacts (not shown) due to the induced dipole moment, or by detecting the change in adsorption of the radiation at wavelength $hv_1$ or $hv_2$. The device according to the present invention has the advantage that the wells associated with dots D1 and D2 are individually tunable by virtue of adjustment of their lateral extent and consequently, the relative levels E1-E3 are tunable in order to achieve resonance with the wavelength of incoming radiation and to produce a desired output.

Figure 16:
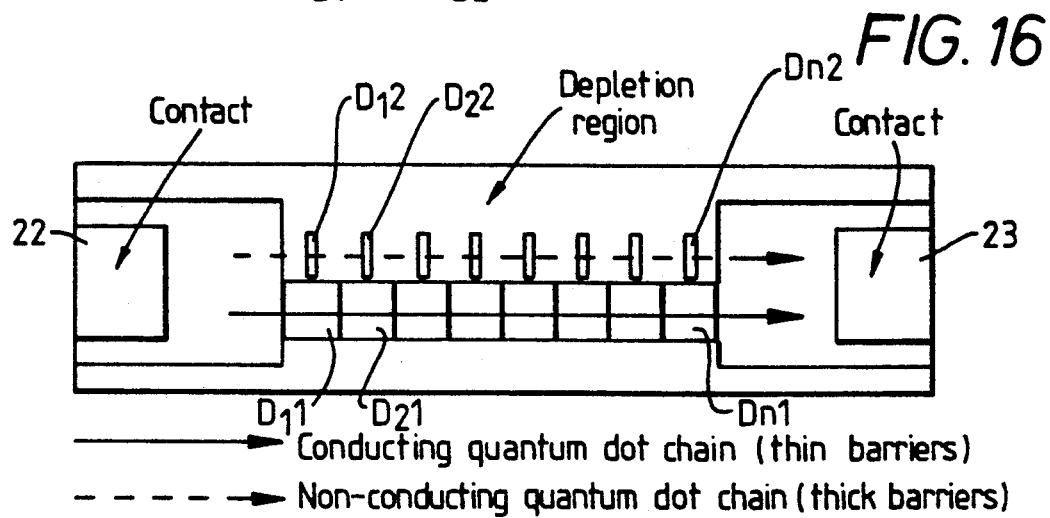
FIG. 16 illustrates devices according to the invention, incorporated into an optical switching device.

Devices as shown in FIG. 11 or FIG. 13 can be used in a chain to define an opto-electronic switch as shown in FIG. 16. The quantum dot structures are so arranged that the larger quantum dots $D_11-D_n1$ are separated by relatively thin barriers and thereby define a normally conducting quantum dot chain extending from an input contact 22 to an output contact 23. The smaller quantum dots $D_12-D_n2$ form a non-conducting chain between the contacts 22, 23 since the width of the barriers between the dots $D_2$ are relatively large and inhibit conduction.

The potential well configuration between each set of dots D1-D2 is substantially as shown in FIGS. 15A and 15B. Thus, when the device is illuminated with radiation of wavelength $hv_1$ as shown in FIG. 15a, the energy state E3 become populated for each of the wells associated with dots D2. As a result of the depopulation of dots D1, the normally conducting channel suffers a decrease in conductivity and thus its conductivity can be switched in response to incoming radiation of a particular wavelength. The small dots D2 are analogous to localized electron traps in a bulk semiconductor which quench conductivity due to transport in the conduction band. The device can be switched back into conduction by the application of illumination of wavelength $hv_2$, which causes electrons from dots D2 to be shifted back into dots D1, i.e., from energy level E3 to level E1 via E2. Since the lateral extent of the dots D1, D2 can be controlled by the bias voltages V1-V3 as previously described, the switch can be tuned to incoming radiation of wavelength $hv_1$, $hv_2$ and resonance is not purely a function of the device geometry achieved during fabrication.

Figure 17:
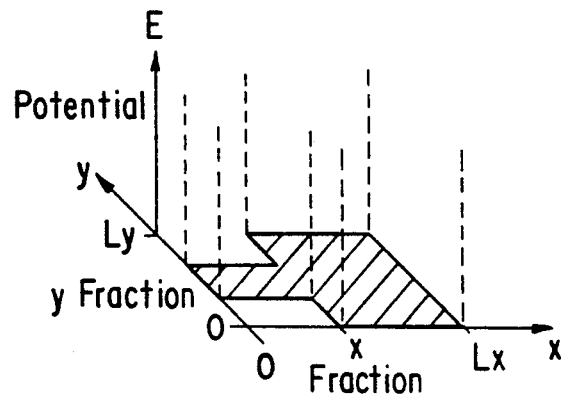
FIG. 17 illustrates schematically dimensions of an asymmetrical dot for use in computing a maximised dipole moment.
Figure 18A:
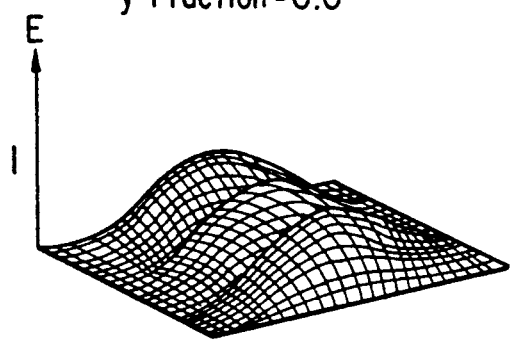
FIGS. 18A to 18D are a series of plots of wavefunction for different degrees of asymmetry of the quantum dot shown in FIG. 17.
Figure 18B:
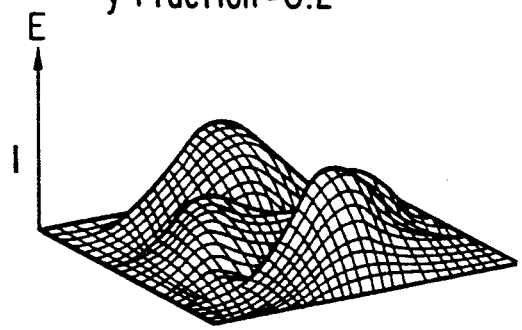
Figure 18C:
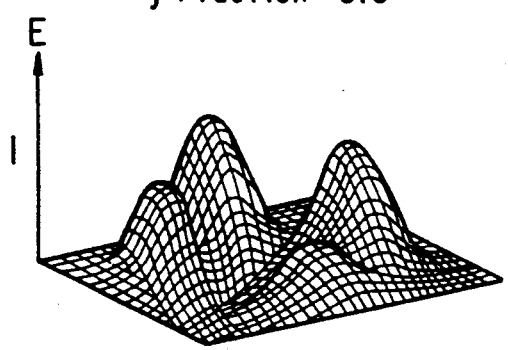
Figure 18D:
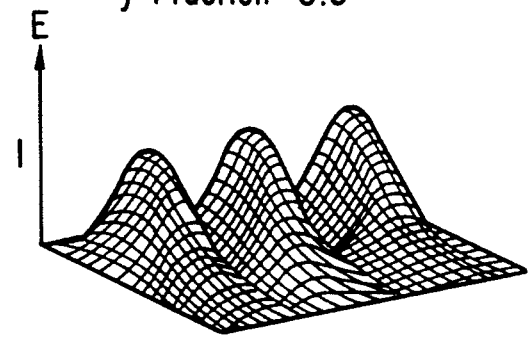

Theoretical calculations of the non-linear coefficient of a laterally asymmetric quantum dot such as shown in the preceding examples of the present invention, carried out using quantum mechanical perturbation theory, has shown that the size of the dipole moment of the asymmetrical dot is comparable with that of the prior structures described with reference to FIGS. 1 and 2, but with the advantage that both the size and lateral asymmetry of the dot can be controlled to provide additional flexibility in optimizing the structure for different wavelengths of operation. Referring to FIG. 17, it has been found that for a given wavelength of operation, when the size of the dot and degree of asymmetry are adjusted to simultaneously maximize dipole moments and achieve a resonance condition in which an equal energy separation exists between the three lowest energy bands, there exists a fixed relationship between the width of the pinched region of the dot and its length as follows:

$$(1-2 \cdot yfraction) \cdot L_y = (\tfrac{1}{3}) \cdot L_x$$

In the foregoing, yfraction is the measure of the width of the pinched region.

$L_y$ = overall width of the quantum dot
$L_x$ = overall length of the quantum dot
Thus, the width of the pinched region is equal to one third of the length of the quantum dot.

This relationship is the result of the symmetry of the (1,3) and the (3,1) wavefunctions involved in the upper state of the resonant 3-level system. These states are orthogonal when the quantum dot is symmetrical, but mix under the influence of an applied asymmetry, e.g., when the quantum dot is switched from the condition shown in FIG. 4a to that shown in FIG. 4b. The condition of maximum mixing and therefore largest non-linear coefficient is given by the above relationship.

Referring to FIG. 18, this shows the evolution of the (3,1) wavefunction with increasing asymmetry. At about yfraction=0.3, the mixing of the (1,3) and (3,1) modes is optimized. Thus, the above relationship can be considered as a simple design rule to optimize the properties of the laterally asymmetric quantum dot.

We claim:

1. A non-linear optical device comprising at least one quantum dot structure including,
   means for defining a potential well configuration for a charge carrier in a quantized energy state, the well configuration including at least one well having a given depth and lateral extent, and
   means for applying an electrical bias to the well configuration to alter the lateral extent thereof and thereby control an asymmetry therein that manifests a non-linear optical characteristic in response to incident radiation.

2. The device of claim 1 wherein the quantum dot structure is formed in a semiconductor substrate.

3. The device of claim 2 wherein the substrate includes means for defining a conductive region, and means for confining said conductive region to a particular area whereby to define said well.

4. The device of claim 3 wherein said means for confining comprises means for defining a region surrounding the well.

5. The device of claim 2, wherein the means for applying an electrical bias comprises an electrode disposed laterally of the well.

6. The device of claim 1, including a plurality of said quantum dot structures arranged in an array wherein for each said dot, first and second electrodes are disposed on opposite lateral sides thereof to apply said bias thereto.

7. The device of claim 1 including a plurality of said quantum dot structures arranged in groups arranged to receive a respective different bias such that the dots of each group are imparted with a respective lateral asymmetry.

8. The device of claim 6, wherein said dot structures are arranged in a 3-dimensional array.

9. The device of claim 6, including means for directing light through said quantum dot structures.

10. The device of claim 9 wherein said means for directing light includes means for producing multiple reflection of incident light through said quantum dot structures.

11. The device of claim 1, including means for directing coherent optical radiation onto said quantum dot structure.

12. The device of claim 1, wherein the said quantum dot structure includes a potential well configuration including first and second wells which in combination exhibit said asymmetry.

13. The device of claim 12, wherein said means for applying an electrical bias is arranged to control the lateral extent of the wells individually.

14. The device of claim 12 further including means for controlling the lateral extent of a potential barrier between said wells.

15. The device of claim 14 wherein said barrier is of a width to produce optical rectification.

16. The device of claim 14 wherein said barrier is of a width to produce a harmonic of an incoming radiation of a particular frequency.

17. The device of claim 12, so arranged that in response to incoming radiation of a particular frequency, charge carriers are switched from one of said wells to the other thereof in an essentially bistable manner and, in response to incoming radiation of a different frequency, said carriers are switched from one well to the other thereof in an essentially bistable manner.

18. The device of claim 17 including a plurality of said quantum dot structures arranged in a chain whereby first wells thereof define a path switchable from a relatively conductive to a relatively non-conductive condition by incoming radiation.

19. A quantum dot structure comprising means for defining a potential well configuration for a charge carrier in a quantized energy state, the well configuration having a given depth and lateral extent, and means for applying an electrical bias to the well to control the lateral extent thereof and thereby control an asymmetry therein.

20. The quantum dot structure of claim 19, wherein laterally, the well has a length Lx, a width Ly, and a transverse pinched region narrower than said width to provide the asymmetry, wherein the width of the pinched region is a predetermined fraction of the length Lx.

21. The quantum dot structure of claim 20 wherein the width of the pinched region is one third of the length Lx of the quantum dot, to thereby maximize asymmetry for the three lowermost quantized energy bands for the dot.

* * * * *

UNITED STATES PATENT AND TRADEMARK OFFICE
CERTIFICATE OF CORRECTION

PATENT NO. : 5,291,034
DATED : March 1, 1994
INVENTOR(S) : Jeremy Allam, et al

It is certified that error appears in the above-indentified patent and that said Letters Patent is hereby corrected as shown below:

Column 3, line 16, after "according to" insert --an embodiment of--.
Column 3, line 17, after "FIG. 3B is" delete "an embodiment of".

Signed and Sealed this

Second Day of August, 1994

Attest:

BRUCE LEHMAN

Attesting Officer     Commissioner of Patents and Trademarks